(12) United States Patent
Barak

(10) Patent No.: US 8,938,726 B2
(45) Date of Patent: Jan. 20, 2015

(54) INTEGRATING NATIVE APPLICATION INTO WEB PORTAL

(75) Inventor: Nimrod Barak, Tel Aviv (IL)

(73) Assignee: SAP AG, Walldorf (DE)

( * ) Notice: Subject to any disclaimer, the term of this patent is extended or adjusted under 35 U.S.C. 154(b) by 110 days.

(21) Appl. No.: 13/596,906

(22) Filed: Aug. 28, 2012

(65) Prior Publication Data

US 2014/0068589 A1 Mar. 6, 2014

(51) Int. Cl.
*G06F 9/45* (2006.01)

(52) U.S. Cl.
USPC ............................................. 717/147

(58) Field of Classification Search
USPC ........... 717/170, 147, 178; 345/700; 709/217; 455/418; 719/318
See application file for complete search history.

(56) References Cited

U.S. PATENT DOCUMENTS

| | | | |
|---|---|---|---|
| 7,984,417 B2 | 7/2011 | Ben-Zvi et al. | |
| 8,621,450 B2 * | 12/2013 | Firman et al. | 717/170 |
| 2002/0057283 A1 * | 5/2002 | Biswas et al. | 345/700 |
| 2010/0205274 A1 * | 8/2010 | Gharabally et al. | 709/217 |
| 2011/0119663 A1 * | 5/2011 | Liu | 717/170 |
| 2011/0302571 A1 * | 12/2011 | O'Farrell et al. | 717/170 |
| 2013/0040626 A1 * | 2/2013 | Morgaine | 455/418 |
| 2013/0219413 A1 * | 8/2013 | Hartz et al. | 719/318 |
| 2013/0297662 A1 * | 11/2013 | Sharma et al. | 707/827 |
| 2014/0019958 A1 * | 1/2014 | Sherman | 717/178 |

OTHER PUBLICATIONS

U.S. Appl. No. 13/301,971, filed Nov. 22, 2011; entitled "Role Based Automatic Content Focus in Mobile Portal Applications".
U.S. Appl. No. 13/595,268, filed Aug. 27, 2012; entitled "Business Notification Engine".

* cited by examiner

*Primary Examiner* — Tuan A Vu
(74) *Attorney, Agent, or Firm* — Fish & Richardson P.C.

(57) ABSTRACT

The present disclosure describes methods, systems, and computer program products for integrating native applications into web portals. One computer-implemented method includes connecting a business enterprise portal (BEP) with a mobile device, wherein the BEP provides web-based and native-application-based content; analyzing the mobile device with the BEP to identify a native application applicable to the BEP, the native application associated with the web-based and native-application-based content and locally operational in the mobile device; generating metadata associated with at least the native application; generating a data object representing the native application and the associated metadata; and launching, from the BEP, the native application using the generated metadata.

20 Claims, 3 Drawing Sheets

INTEGRATING NATIVE APPLICATION INTO WEB PORTAL

BACKGROUND

A business enterprise portal, also known as an enterprise information portal (EIP) or corporate portal, is a framework for integrating information, people and processes across organizational boundaries. The enterprise portal can provide a secure unified access point, often in the form of a web-based user interface (i.e., a web portal realized using an internet browser on a computing device), and can be designed to aggregate and personalize information through application-specific portlets. One significant feature of enterprise portals is de-centralized content contribution and content management, which can keep enterprise portal information updated. Fundamental features of an enterprise portal may include: a single sign-on/log-in, application integration, content federation, environment customization, information personalization, access control, and/or enterprise search/support, among others.

Native applications, application software, applications, application programs, or apps are computer programs installed onto an operating system native to a particular user device, such as a smart phone, a tablet computer, a notebook computer, or other computing device. Native applications can generally operate without a network connection. Application software, contrasted with operating system or non-application software is designed enable the user to perform specific tasks. For example, application software can include enterprise software, accounting software, office suites, graphic software and media players. A mobile application (or mobile app) is a native application designed to run on mobile devices such as smartphones, tablet computers, personal digital assistants (PDA's), and the like. In some configurations, a mobile device can include a number of native mobile applications and a web browser that can access enterprise portals.

SUMMARY

The present disclosure relates to methods, systems, and computer-readable media for integrating native applications into web portals. One computer-implemented method includes connecting a business enterprise portal (BEP) with a mobile device, wherein the BEP provides web-based and native-application-based content; analyzing the mobile device with the BEP to identify a native application applicable to the BEP, the native application associated with the web-based and native-application-based content and locally operational in the mobile device; generating metadata associated with at least the native application; generating a data object representing the native application and the associated metadata; and launching, from the BEP, the native application using the generated metadata.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, wherein the metadata associated with at least the native application comprises a name, a description, an introduction date, version information, version history, vendor information, rating information, tag information, comments, operating system information, a role of the mobile device, a usage history, a preference record, parameters describing such, or a combination of such.

A second aspect, combinable with any of the previous aspects, further includes verifying a version of the native application using the metadata, and updating the native application, in response to a determination that the metadata is not applicable to the version of the native application, into a new version of the native application.

A third aspect, combinable with any of the previous aspects, wherein updating into a new version of the native application comprises downloading the new version of the native application from a web source and installing the new version of the native application to the mobile device.

A fourth aspect, combinable with any of the previous aspects, wherein generating metadata associated with at least the native application comprises assigning the native application to an end user.

A fifth aspect, combinable with any of the previous aspects, further includes maintaining the metadata based on activities in the launched native application.

A sixth aspect, combinable with any of the previous aspects, wherein launching, from the BEP, the native application using the generated metadata comprises using a URL scheme supported by the mobile device operating system to initiate the native application.

A seventh aspect, combinable with any of the previous aspects, wherein the metadata provides a context to the native application, the context comprising a plurality of suggested contents, documents, data, or applications associated with the native application.

The subject matter described in this specification can be implemented in particular implementations so as to realize one or more of the following advantages. With an increasing number of native applications available to mobile devices, a method to aggregate various native applications can increase productivity and efficiency. An enterprise portal can be used to federate and aggregate multiple native applications to improve resource management and allocation. In addition, integrating native applications into an enterprise portal can enable users to apply a contextual environment to each native application from the enterprise portal. For example, the enterprise portal can be associated with the digital identity of a user, therefore including various metadata related to the digital identity, such as preferences, history, authority, and state information, among others. The metadata related to the digital identity can be applied to the native applications using the enterprise portal. For example, the enterprise portal can recognize native applications applicable to the digital identify of the user, and apply the metadata to the native applications at launching of the native applications so that contextual environment of the native applications can be tailored to the user, providing a coherent user experience. The enterprise portal can also provide additional contextual services and data on top of the native applications, such as related applications, documents, reports, etc. For example, a link to a native "leave request" application can enable a user to access from a portal mobile client and receive a pop-up message about revised vacation policies associated with the "leave request". The pop-up message can also include additional links to the updated policy document.

While generally described as computer-implemented software embodied on tangible and non-transitory media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
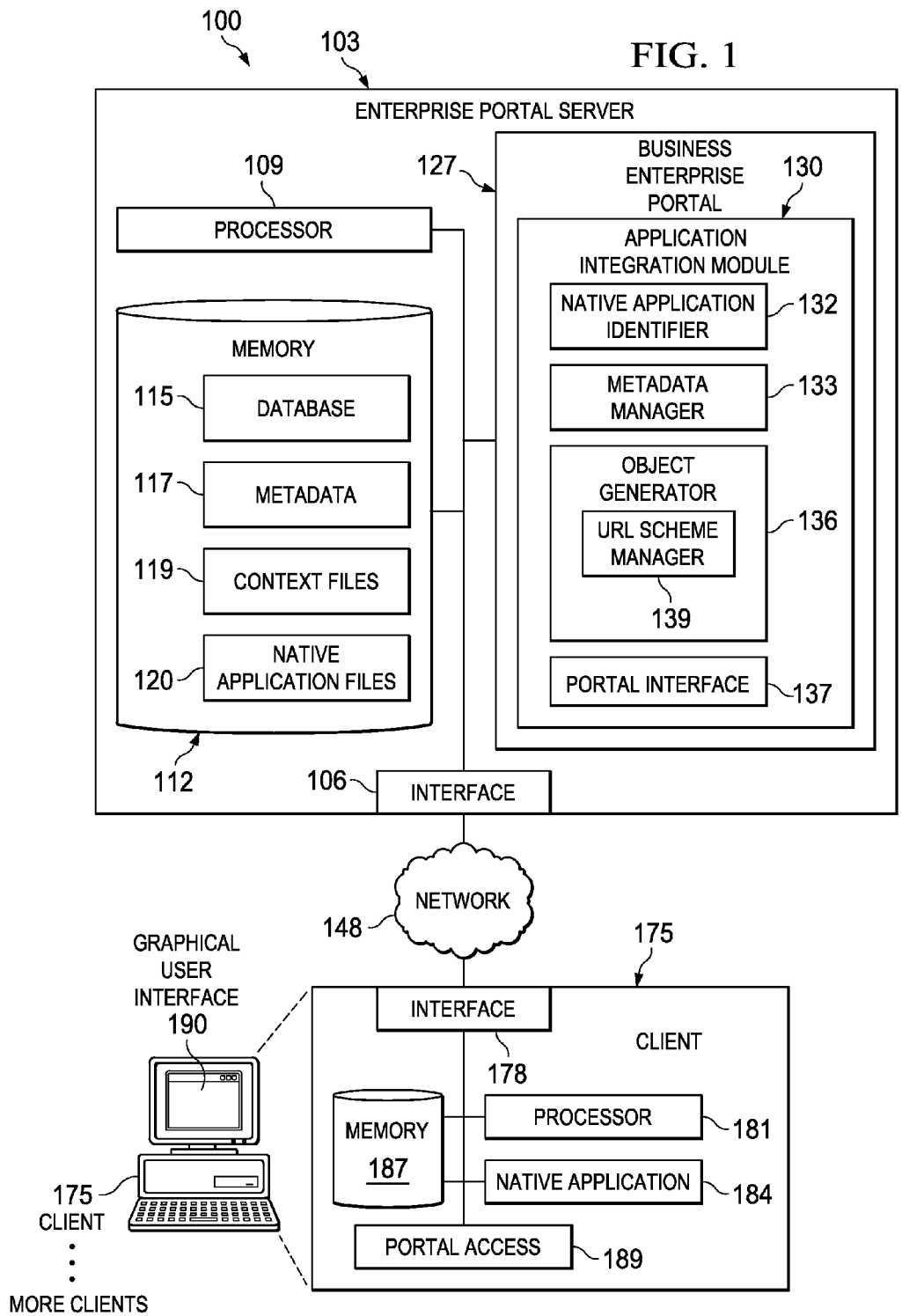
FIG. 1 illustrates an example environment for implementing various features of a business enterprise portal server providing native application integration.

This specification describes methods, systems, and computer-readable media for integrating native applications into web portals. In many instances, users are provided a single enterprise portal to aggregate multiple native applications and create a customized application environment at launch of the portal to provide a coherent user experience. With an increasing number of native applications available to mobile devices, a method to aggregate various native applications can increase productivity and efficiency. An enterprise portal can be used to federate and aggregate multiple native applications to improve resource management and allocation. In addition, integrating native applications into an enterprise portal can enable a contextual environment for each native enterprise portal application. For example, the enterprise portal can be associated with the digital identity of a user, therefore including various metadata related to the digital identity, such as preferences, history, authority, and state information, among others. The metadata related to the digital identity can be applied to the native applications using the enterprise portal. For example, the enterprise portal can recognize native applications applicable to the digital identify of the user, and apply the metadata to the native applications at launch so that contextual environment of the native applications can be tailored to the user.

At a high level, an enterprise portal integrated with native applications can enable a user to view, manage, and launch the native applications with information related to the user (e.g., the user's role, rank, responsibility, etc.). On a mobile or other computer device, the user can use a digital identity to enter the enterprise portal and retrieve metadata related to their digital identity. The enterprise portal can analyze the mobile device to identify native applications associated with the digital identity of the user. The enterprise portal can then display (e.g., in the webpage of the enterprise portal) a data object directed to one of the identified native applications overlaid with metadata of the digital identity. The user can launch one of the identified native applications at the enterprise portal to open the application with contextual information provided by the metadata associated with the user's digital identity. For example, the native application can be opened using a preferred state, usage history, user role (e.g., manager, engineer, sales, etc.), and provide the user tailored functions and information to improve productivity. In addition, the native applications can be administered in new set of tools available on the enterprise portal, which can allow assignment of roles and configuration of contextual data, among others. At runtime, the user can enjoy single role access to all types of content, with an advanced suggestions mechanism for both web and native content. In some implementations, the enterprise portal can further provide social capabilities, such as rating, and commenting.

FIG. 1 illustrates an example environment for implementing various features of a business enterprise portal server providing native application integration. The illustrated example environment 100 includes, or is communicably coupled with, a client 175, and an enterprise portal server 103. At least some of the communications between the enterprise portal server 103 and the client 175 may be performed across or using network 148. In general, environment 100 depicts an example configuration of a system for providing the client 175 with business enterprise portal access using the enterprise portal server 103. For example, the enterprise portal server 103 can provide, in addition to business enterprise portals, applications, processing resources, and/or database resources to the client 175 (e.g., to support native applications 184). In alternative implementations, the elements illustrated in FIG. 1 can be included in or associated with different and/or additional servers, clients, networks, and locations other than those as shown. For example, there may be additional clients sending messages to the enterprise portal server 103. As another example, multiple clients may be connected to one or more servers similar to the enterprise portal server 103 in order to obtain various functionalities and services. In some implementations, one or more of the components illustrated within the enterprise portal server 103, the client 175, or any of the other illustrated components, can be located in multiple or different servers, cloud-based networks, or other locations accessible to the enterprise portal server 103 either directly or indirectly using network 148.

At a high level, the enterprise portal server 103 can be connected with one or more clients, such as the client 175. For example, the enterprise portal server 103 can host a business enterprise portal 127 that can be accessed by the one or more clients 175 using requests to enterprise portal server 103 using a web browser. The business enterprise portal 127 can be displayed as a webpage at the client 175, for example, at the GUI 190. The enterprise portal server 103 may also provide background and contextual support related to the client 175 (e.g., license information, updates, state preferences, usage history, computation, storage, etc.) to the native application 184. In some implementations, the business enterprise portal 127 can include metadata for generating and implementing a contextual environment based on properties of the client 175 for the native application 184. For example, the metadata 117 stored at the memory 112 can include digital identity information related to the client 175. When the client 175 accesses the business enterprise portal 127, authentication and identification procedures can be performed to allow the client 175 to access a corresponding digital identity.

In the illustrated implementation of FIG. 1, the enterprise portal server 103 includes an interface 106, a processor 109, memory 112, and the business enterprise portal 127.

The interface 106 is used by the enterprise portal server 103 to communicate with other systems in a client-server or other distributed environment (including within environment 100)

connected to the network 148 (e.g., the client 175, as well as other systems communicably coupled to the network 148). The interface 106 generally includes logic encoded in software and/or hardware in a suitable combination and operable to communicate with the network 148. More specifically, the interface 106 may include software supporting one or more communication protocols associated with communications such that the network 148 or the interface hardware is operable to communicate physical signals within and outside of the illustrated environment 100.

The processor 109 can be any appropriate processing unit or units to enable computation in the enterprise portal server 103. Although illustrated as a single processor 109 in the enterprise portal server 103, two or more processors may be used in the enterprise portal server 103 according to particular needs, desires, or particular embodiments of environment 100. Generally, the processor 109 executes instructions and manipulates data to perform the operations of the enterprise portal server 103 and, specifically, the functionality associated with the corresponding business enterprise portal 127. In one implementation, the server's processor 109 executes the functionality required to receive inbound communications from and send outbound communications to the client 175, as well as the functionality required to perform the operations of the associated business enterprise portal 127.

The memory 112 of the illustrated enterprise portal server 103 stores at least a database 115, metadata 117, context files 119, native application files 120, and other data and program instructions (not illustrated). In some implementations, including a cloud-based system, some or all of the memory 112 may be stored remote from the enterprise portal server 103, and communicably coupled to the enterprise portal server 103 for usage. The metadata 117 can be associated with the digital identity of the client 175 and embedded into the business enterprise portal page delivered to the client 175. The context files 119 can include data files used in native applications to customize the application environment based on the metadata 117. The native application files 120 can include application software operable at the client 175 or in support of the native application 184 of the client 175. Some or all of the elements illustrated within memory 112 may be stored external to the memory 112 in other memories 112.

At a high level, the business enterprise portal 127 can be a framework for integrating information, people, and processes across organizational boundaries at a particular enterprise portal server 103. In particular, the business enterprise portal 127 may be associated with one or more business processes that communicate with other users, applications, systems, and components to send, receive, and process events. In some implementations, a particular business enterprise portal 127 may operate in response to and in connection with one or more requests received from an associated client 175 or other remote client. Additionally, a particular business enterprise portal 127 may operate in response to and/or in connection with one or more requests received from other applications external to the enterprise portal server 103. In some implementations, one or more of the applications may represent a web-based application accessed and executed by remote clients 175 using the network 148 (e.g., through the Internet or using one or more cloud-based services associated with the business enterprise portal 127). Further, while illustrated as internal to the enterprise portal server 103, one or more processes associated with a particular business enterprise portal 127 may be stored, referenced, or executed remotely. For example, a portion of a particular business enterprise portal 127 may be a web service that is remotely called, while another portion of the business enterprise portal 127 may be an interface object or agent bundled for processing at a remote system (e.g., system support at the client 175), or a particular client (e.g., the native application 184). Portions of the particular business enterprise portal 127 may be executed or accessed by a user working directly at the enterprise portal server 103, as well as remotely at a corresponding client 175.

The business enterprise portal 127 includes an application integration module 130 that enables the business enterprise portal 127 to integrate native applications 184 of the client 175 into the business enterprise portal 127. The business enterprise portal 127 includes an application integration module 130 for integrating native applications into the business enterprise portal 127, as well as other enterprise portal related applications, databases, web content, and networking information not illustrated in FIG. 1. The application integration module 130 includes a native application identifier 132, a metadata manager 133, an object generator 136, and a portal interface 137. The native application identifier 132 can identify native applications of connected clients. For example, upon a request from the client 175 to access the business enterprise portal 127, the business enterprise portal authenticates the client 175 (e.g., allowing the client 175 to be signed in to a digital identity) and initiates the business enterprise portal 127. The initiation of the business enterprise portal 127 retrieves client information on the enterprise portal server 103 as well as from the client 175. The native application identifier 132 can search in the client 175 (e.g., by checking an application registry of the operating system) and gather the native applications applicable to the business enterprise portal 127. In some implementations, the native applications are designed to run on specific operating systems, such as the IOS, ANDROID, LINUX, UNIX, and WINDOWS, among others. The native applications may include sales analysis, manager insight, electronic medical record, fact sheet, briefing, sales, business one, interview, and other business applications.

The native application identifier 132 can obtain files related to the native applications 184 and save the native application files 120 in the memory 112. The native application files 120 can be data files related to both the business enterprise portal 127 and the native application 184. For example, the native application files 120 can include version data, event logs, back-up data, and other files associated with the native application 184. The native application files 120 may have an identical and synchronized copy saved in the memory 187 of the client 175. In some implementations, if the native application 184 or a version of the native application 184 associated with the digital identity accessing the business enterprise portal 127 is not available or not compatible to the current metadata 117, the native application identifier 132 can provide a download link for updating the correct version of the native application 184.

The metadata manager 133 can manage metadata 117 related to a digital identity signed in by the client 175. For example, the metadata manager 133 can create, save, load, import, export, and delete metadata 117 associated with a digital identity. The metadata manager 133 can save the metadata 117 in the memory 112. The metadata 117 of the digital identity can include role information, preference, setting, usage history, access authority, license information, and other metadata that can provide contextual information to the business enterprise portal 127 and the native application 184. In some implementations, the metadata 117 can be used to customize the native application 184 based on the role of the client 175. For example, the user interface, as well as functions and displayed information, of the native application 184, can be presented differently to users with roles of manager, engineer, sales, and other roles. As an example, a native application of a type of dash board, the user interface of the native application may be customized. Managers may have a user interface showing employee information in the same team of management. Engineers may have a user interface showing progress of a project and the upcoming tasks. Sales people may have a user interface showing recent orders, customer's information, and product information. In other instances, the native application can include other functions, such as sales analysis, interviewing, briefing, and travel, among others.

In some implementations, metadata 117 can be processed (e.g., by grouping, extracting, etc.) into context files 119 for each particular native application. For example, part of the metadata 117 related to a specific function or program is packaged as one context file 119. Similarly, the metadata 117 may be represented by a number of context files 119 to provide the native application 184 a contextual reference. For example, a native application 184 can provide basic functions to manage vacation requests for a manager. A context file 119 for the manager's digital identity may be created with the vacation request from employees who place the request. The context file 119 is part of the metadata 117, which is loaded when the business enterprise portal 127 is accessed by the manager. The manager may be notified given the information retrieved from the metadata 117. When the manager launches the native application 184, the metadata 117, or the specific context file 119, can be overlaid to the native application 184 and provide a contextual environment directed to the current requests carried in the context file 119. In this contextual environment, the manager can save effort and time in opening the requests. The context file 119 may also invoke functions and tools related to responding the requests in the native application 184, streamlining the actions by the manager.

The object generator 136 can generate data objects for the business enterprise portal 127, where each data object is linked with a specific native application 184 and the metadata 117. The data object can overlay the metadata 117 to the native application 184 at launch. For example, the data object can be generated by the object generator 136 using a uniform resource locator (URL) scheme. The URL scheme can be managed using a URL scheme manager 139. The URL scheme can be based on a common standard for launching native applications on a mobile operating system. When a user selects (e.g., by a touch gesture, or using a pointer device) the data object, the data object can launch the linked native application with contextual data. The native application is opened in the operating system, separate from the business enterprise portal. In some implementations, the URL scheme manager 139 can pair native applications with different digital identities accessing the business enterprise portal 127. The object generator 136 can generate the data objects for the corresponding digital identities. For example, two different digital identities can have two specific data objects generated for the same native application based on different metadata information.

The portal interface 137 can interface the native applications identified by the native application identifier 132 with the business enterprise portal 127. The portal interface 137 can enable capabilities in the design-time environment, as well as in the client of the business enterprise portal 127, for a tight integration of native applications 184 to provide a coherent user experience. For example, the native applications 184, using the portal interface 137, can be administered by a set of tools in the business enterprise portal 127, which can allow for assignment to roles and configuration of contextual data, among other functionalities. In runtime, the user may use a single role access to all types of content, with advanced suggestions mechanism supported by the portal interface 137 for both web and native content. The access to the native applications 184 using the portal interface 137 can be smooth, as the portal interface 137 can inform and install versions of native applications not yet available on the client device. In some implementations, the portal interface 137 can provide social networking capabilities related to the native applications, such as rating and commenting.

In general, the application integration module 130 can manage the native applications 184 in the business enterprise portal 127 using advanced administration capabilities. Based on the same experience and tools accumulated from other environments in the business enterprise portal 127, administrators of native applications can configure several features for the native applications, including general details (e.g., name, description, vendor, etc.), installation details (e.g., location in download platform), version details (i.e., version of the current installed native application), social capabilities, role assignment, and related documentation. As the native applications 184 are assigned to the roles associated with the digital identity of the client 175, other properties associated with the roles can be used and presented in the business enterprise portal 127 along with the data object linking to the native applications 184. For example, the native application 184 may be displayed using regular tools of a mobile portal (e.g., content explorer, link list, etc.) or using a custom application developed on the business enterprise portal 127.

The enterprise portal server 103 is any server or system that stores, manages, and executes functionality associated with the business enterprise portal 127. Additionally, the enterprise portal server 103 may execute one or more business enterprise portals 127. In some instances, each enterprise portal server 103 may store a plurality of various applications (not shown); while in other instances, the enterprise portal server 103 may be a dedicated server meant to store and execute the business enterprise portal 127 for a particular platform or application and its related functionality. In some instances, the enterprise portal server 103 may include a web server or be communicably coupled with a web server, where one or more of the business enterprise portals 127 associated with the enterprise portal server 103 represent web-based (or web-accessible) applications accessed and executed through requests and interactions received by the client 175, executing a native application 184 operable to interact with programmed tasks or one or more business enterprise portals 127.

The enterprise portal server 103 can include an electronic computing device operable to receive, transmit, process, store, or manage data and information associated with the environment 100. The enterprise portal server 103 illustrated in FIG. 1 can be responsible for receiving application-related requests from one or more clients 175 (as well as any other entity or system interacting with the enterprise portal server 103, including desktop or mobile client systems), responding to the received requests by processing said requests in the associated business enterprise portal 127, and sending the appropriate responses from the appropriate component back to the requesting client 175 or other requesting system. Components of the enterprise portal server 103 can also process and respond to local requests from a user locally accessing the enterprise portal server 103. Accordingly, in addition to requests from the client 175 illustrated in FIG. 1, requests associated with a particular component may also be sent from internal users, external or third-party customers, and other associated business applications, business processes, as well as other appropriate entities, individuals, systems, or computers. In some instances, the business enterprise portal 127 or the native application 184 may be a web-based application executing functionality associated with a networked or cloud-based business process.

Referring now to the client 175 illustrated in FIG. 1, the client 175 may be any computing device operable to connect to or communicate with the enterprise portal server 103 using a wireline or wireless connection directly or using the network 148, or another suitable communication means or channel. In some instances, the client 175 may be a part of or associated with a business process involving one or more of a remote developer or user associated with the business enterprise portal 127, for example, the native application 184. It will be understood that there may be any number of clients 175 associated with, or external to, environment 100. For example, while illustrated environment 100 includes a single client 175, alternative implementations of environment 100 may include multiple sellers or customers communicably coupled to one or more of the systems illustrated. In some instances, one or more clients 175 may be associated with administrators of the environment, and may be capable of accessing and interacting with the settings and operations of one or more business enterprise portals 127, and/or other components of the illustrated environment 100. Additionally, there may also be one or more additional clients 175 external to the illustrated portion of environment 100 capable of interacting with the environment 100 using the network 148.

The illustrated client 175 includes an interface 178, a processor 181, the native application 184, a portal access 189, and a memory 187. The interface 178 is used by the client 175 for communicating with other systems in a distributed environment—including within the example environment 100—connected to the network 148; for example, the enterprise portal server 103 as well as other systems communicably coupled to the network 148 (not illustrated). The interface 178 may also be consistent with the above-described interface 106 of the enterprise portal server 103 or other interfaces within the example environment 100. The processor 181 may be consistent with the above-described processor 109 of the enterprise portal server 103 or other processors within the example environment 100. Specifically, the processor 181 executes instructions and manipulates data to perform the operations of the client 175, including the functionality required to send requests to the enterprise portal server 103 and to receive and process responses from the enterprise portal server 103. The memory 187 may be consistent with the above-described memory 112 of the enterprise portal server 103 or other memories within the example environment 100 but storing objects and/or data associated with the purposes of the client 175.

Further, the representative client 175 illustrates a GUI 190 applicable to the client 175 in general. The GUI 190 provides a visual interface with at least a portion of the example environment 100. Generally, through the GUI 190, enterprise portal server 103 users are provided with an efficient and user-friendly presentation of data provided by or communicated within the example environment 100. For example, the GUI 190 may be associated with the native application 184 and used to view, navigate, and/or configure the business enterprise portal 127, navigation lists, and associated content served by enterprise portal server 103. In some implementations, the native application 184 may be used to access various portions of the enterprise portal server 103. In some instances, the native application 184 may be an agent or client-side version of the business enterprise portal 127 or other suitable component of the enterprise portal server 103. The GUI 190 may present the information of the native application 184 for viewing and interaction. In some implementations, the application integration module 130, as well as other modules and configurators, can interact with users using the GUI 190. For example, the application integration module 130 can display the business enterprise portal 127 along with other application windows for user interaction in the GUI 190.

As used in this disclosure, each client 175 is intended to encompass a personal computer, touch screen terminal, workstation, network computer, kiosk, wireless data port, smart phone, personal data assistant (PDA), one or more processors within these or other devices, or any other suitable processing device. For example, each client 175 may include a computer that includes an input device, such as a keypad, touch screen, mouse, or other device that can accept user information, and an output device that conveys information associated with the operation of one or more native applications 184, and/or the client 175 itself, including digital data, visual information, or the GUI 190. Both the input and output device may include fixed or removable storage media such as a magnetic storage media, CD-ROM, or other suitable media, to both receive input from and provide output to users of client 175 through the display, namely, the GUI 190. As previously stated, the client's processor 181, interface 178, and memory 187 may be similar to or different from those described in connection with the other components illustrated in FIG. 1, although alternative implementations of one or more of these components may be used, as well as implementations where additional components may also be included.

FIG. 1 depicts a client-server environment, but could also represent a cloud-computing network. Various other implementations of the illustrated environment 100 can be provided to allow for increased flexibility in the underlying system, including multiple application systems 103 performing or executing one or more additional or alternative instances of the business enterprise portal 127 for one or more different platforms, as well as multiple instances of the business enterprise portal 127 and its related functionality. In those instances, the different application systems 103 may communicate with each other using a cloud-based network or through the connections provided by network 148. Generally, the enterprise portal server 103 may be communicably coupled with the network 148 that facilitates wireless or wireline communications between the components of the environment 100 (i.e., between the enterprise portal server 103 and one or more clients 175), as well as with any other local or remote computer, such as additional clients, servers, or other devices communicably coupled to the network 148, including those not illustrated in FIG. 1. In the illustrated environment, the network 148 is depicted as a single network, but may be included in more than one network without departing from the scope of this disclosure, so long as at least a portion of the network 148 may facilitate communications between senders and recipients. In some instances, one or more of the components associated with the enterprise portal server 103 may be included within the network 148 as one or more cloud-based services or operations.

The network 148 may be all or a portion of an enterprise or secured network, while in another instance, at least a portion of the network 148 may represent a connection to the Internet. In the illustrated example, at least a portion of the network 148 includes a portion of a cellular or mobile data network or other network capable of relaying SMS messages. In some instances, a portion of the network 148 may be a virtual private network (VPN). Further, all or a portion of the network 148 can include either a wireline or wireless link. Example wireless links may include 802.11/b/g/n, 802.20, WIMAX, and/or any other appropriate wireless link. In other words, the network 148 encompasses any internal or external network, networks, sub-network, or combination thereof operable to facilitate communications between various computing components inside and outside the illustrated environment 100. The network 148 may communicate with, for example, Internet Protocol (IP) packets, Frame Relay frames, Asynchronous Transfer Mode (ATM) cells, voice, video, data, and other suitable information between network addresses. The network 148 may also include one or more local area networks (LANs), radio access networks (RANs), metropolitan area networks (MANs), wide area networks (WANs), all or a portion of the Internet, and/or any other communication system or systems at one or more locations.

Figure 2:
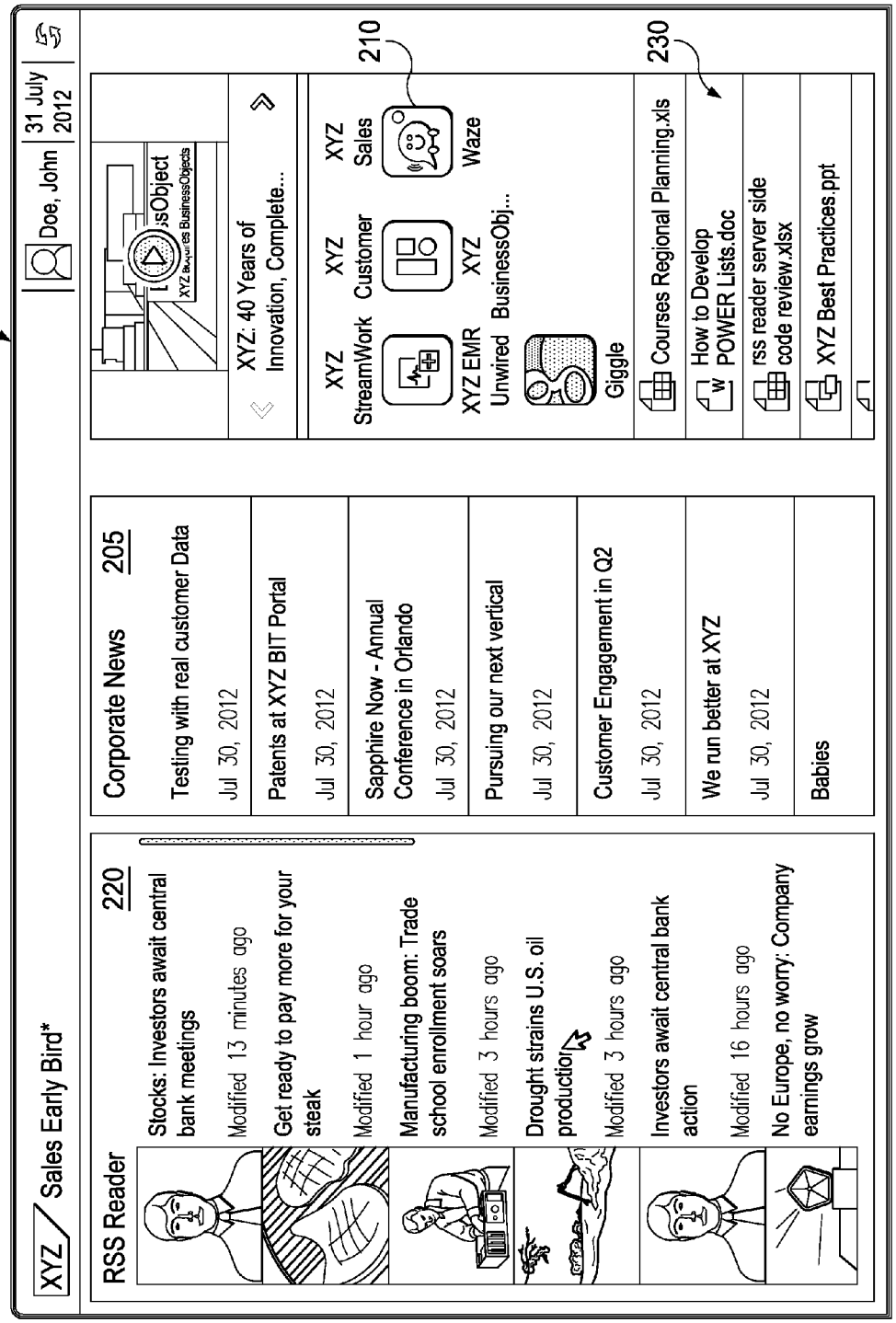
FIG. 2 illustrates an example enterprise portal integrated with native applications.

FIG. 2 illustrates an example enterprise portal 200 integrated with native applications. The user interface of the example enterprise portal 200 can include various content such as incoming news 205, data objects 210 linking to native applications, social network information 220, recent documents 230, and other information. The incoming news 205 can include URL links to news items published for the business enterprise portal, such as corporate news. The social network information 220 can include RSS feeds from corporate, team or group members, such as their activities, and their latest comments or communications. The RSS content may be differ from the incoming news 205 in that the RSS content can be customized and selected based on social network, while the incoming news 205 can be unified for all portal users. The recent documents 230 can include links to the recently edited/viewed documents in the local mobile device as well as from online sources. The data objects 210 can enable users to activate the linked native application with contextual settings defined by metadata provided at the business enterprise portal. For example, the data objects 210 can include hyperlinks, thumbnails, icons, or the like for users to select the linked native applications. At launch of the native application, the metadata overlaid in the data object can inform users that the guideline policy of the native application has changed using a pop-up message.

In some instances, the native application at launch can include a deliver request connected to a backend ERP system. The deliver request may be related to a capital management module within the ERP that requires maintenance operations. This is an example of propagating an IT notification for a maintenance operation on a back-end system. Contextual information can be pushed via an enterprise portal, without the need to being injected to native applications. For example, the portal administrator can create an administration message and attach the message to the native application. Whenever a user tries to launch the application from the portal client, the user can receive this message, valuable for IT management. In some implementations, the enterprise portal 200 may present system messages notifying of maintenance and/or downtime for the resources or metadata related to the native applications being launched. In the illustrated example enterprise portal 200, the social network information 220 may include an RSS reader showing social network activities.

Figure 3:
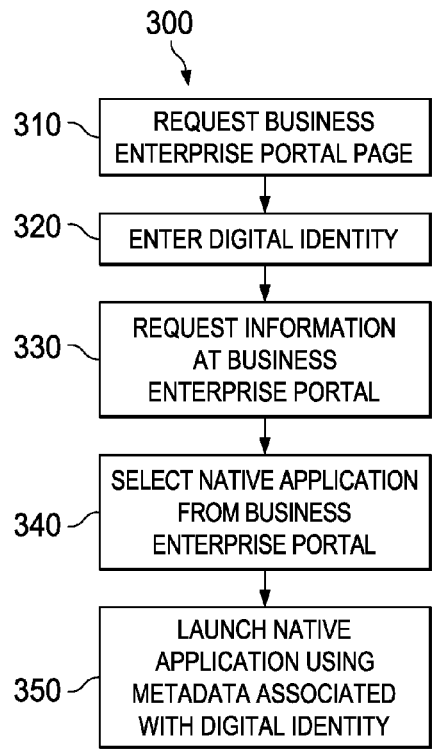
FIG. 3 illustrates an example method for using native applications on a mobile device.

FIG. 3 illustrates an example method 300 for using native applications on a mobile device. The method 300 can be applied to the client 175 of the environment 100 as illustrated in FIG. 1.

At 310, a user at a client device can request access to a business enterprise portal, for example, by requesting a business enterprise portal page in a web browser. The client device can be any mobile electronic device connected to the internet, such as a smart phone, a tablet computer, a notebook computer, and the like. In some implementations, the business enterprise portal page may appear like the example enterprise portal 200 illustrated in FIG. 2. From 310, method 300 proceeds to 320.

At 320, the user enters an authorized digital identity in response to a received business enterprise portal page. In some implementations, the digital identity is associated with the role, job title, responsibility, and other position-related properties of the user. The user can be verified using various authentication methods, such as passwords and biometric data (e.g., fingerprints). From 320, method 300 proceeds to 330.

At 330, the client device requests information associated with the metadata of the digital identity at the business enterprise portal (i.e., from the business enterprise portal server). The metadata of the digital identity can include functions and resources available/applicable to the digital identity, social network/management group of the digital identity, recent activities/documents (e.g., accessed from other mobile devices at the same business enterprise portal), and general information (e.g., corporate news, push notifications, etc.). At the business data portal, the user can view the information along with objects linked with native applications on the client device. From 330, method 300 proceeds to 340.

At 340, the user can select native applications from the business enterprise portal by activating the objects linked with the native applications. From 340, method 300 proceeds to 350.

At 350, in response to the user's selection, the selected native application is launched using the metadata overlaid in the object in the business enterprise portal. The metadata associated with the digital identity of the user can provide the selected native application contextual information. The selected native application can provide the user a contextual environment, such as preferred settings, usage history, access permission, social networking, and other contextual data. From 350, method 300 stops.

Figure 4:
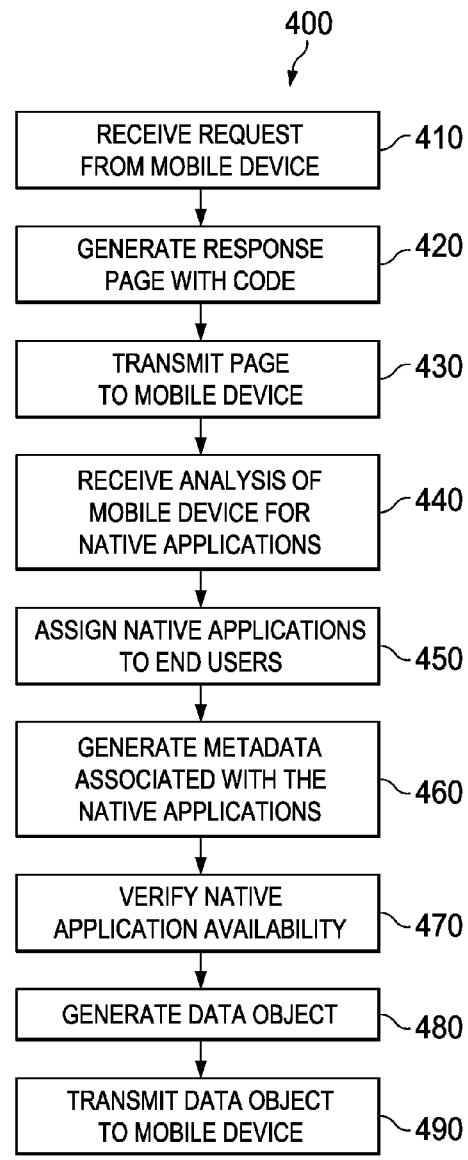
FIG. 4 illustrates an example method for providing native application integration from an enterprise portal perspective.

FIG. 4 illustrates an example method 400 for providing native application integration from a business enterprise portal perspective.

At 410, the business enterprise portal receives an access request from a mobile device of a user. The request may provide identification and authentication information for a digital identity associated with the user. From 410, method 400 proceeds to 420.

At 420, the business enterprise portal can generate a response page with code. From 420, method 400 proceeds to 430.

At 430, the business enterprise portal page is transmitted to the mobile device. The business enterprise portal page includes an analysis engine that can identify native applications applicable to the user on the mobile device. From 430, method 400 proceeds to 440.

At 440, analysis results of the mobile device for native applications performed by the analysis engine is received at the business enterprise portal. The analysis can include detailed information of the native applications, such as version information, association with user metadata, among others. From 440, method 400 proceeds to 450.

At 450, the business enterprise portal can assign native applications to the user, determining which native applications on the mobile device can be applicable to the business enterprise portal. From 450, method 400 proceeds to 460.

At 460, metadata associated with the native applications can be generated. The metadata is based on the digital identity of the user, and generated using previous usage history as well as current usage records. For example, the metadata can be generated by monitoring setting changes in the native applications and recording data access paradigm. The metadata can be updated with each use and update the contextual environment of a same native application on other mobile devices while accessing the same business enterprise portal using the same digital identity. The metadata can also include a URL of the native application directing to a download platform for updates and installation, a URL to an error message in case the required version of the application is not available, and additional configuration information including description, tool tapes, title, version, supported operating system, among others. Other details may also be stored in URLs in the metadata, such as parameters related to the user role, user idea, and other user customized data. From 460, method 400 proceeds to 470.

At 470, the native application availability is verified for the requirement of the metadata, as the launch of the contextual information on the native application requires a matched version. For example, in some instances the native applications required for opening certain resources may not be available on the user device. A default UI that provides a proper message can be prompted to the user, informing the user that the required native application needs to be installed from a certain source. From 470, method 400 proceeds to 480.

At 480, a data object is generated to overlay the metadata to the native application. The data object is presented as a single object (e.g., an icon, a link, or other single selectable item) in the business enterprise portal. From 480, method 400 proceeds to 490.

At 490, the data object is transmitted to the mobile device, providing the user the metadata overlaid native applications for launching with contextual environment settings. From 490, method 400 stops.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX®, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program, by way of example, can be based on general or special purpose microprocessors or both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method for integrating native mobile device applications into web portals, comprising:
   receiving a request from a mobile device to connect to a business enterprise portal, wherein the business enterprise portal provides web-based and native-application-based content, and wherein the request contains a business enterprise portal user's digital identity;
   automatically transmitting, responsive to the request, a business-enterprise-portal-generated module to the mobile device which is executed for mobile device inspection to identify a native application locally operational on the mobile device that is applicable to a function of the business enterprise portal;

receiving data from the mobile device identify the native application, wherein the native application is associated with the web-based and native-application-based content;

generating metadata associated with at least the native application, the metadata based on the business enterprise portal user's digital identity and providing business-enterprise-portal-associated contextual information used to contextually launch the native application;

verifying, based on a requirement of the generated metadata, that the native application version matches a native application version required to contextually launch information on the native application;

generating a data object representing the native application and the associated metadata, the data object linked to the native application and metadata and used to apply the metadata to the native application when the native application is contextually launched; and transmitting the data object to the mobile device for presentation as a data object representation on the mobile device, wherein the data object representation is at least one of a hyperlink, thumbnail, or icon; and responsive to a user action selecting a particular data object representation, contextually launching the native application on the mobile device using the data object.

2. The method of claim 1, wherein the metadata associated with at least the native application comprises a name, a description, an introduction date, version information, version history, vendor information, rating information, tag information, comments, operating system information, a role of the mobile device, a usage history, a preference record, parameters describing such, or a combination of such.

3. The method of claim 1, further comprising:
verifying a version of the native application using the metadata; and
updating the native application, in response to a determination that the metadata is not applicable to the version of the native application, into a new version of the native application.

4. The method of claim 3, wherein updating into a new version of the native application comprises downloading the new version of the native application from a web source and installing the new version of the native application to the mobile device.

5. The method of claim 1, wherein generating metadata associated with at least the native application comprises assigning the native application to an end user.

6. The method of claim 1, further comprising maintaining the metadata based on activities in the launched native application.

7. The method of claim 1, wherein launching, from the business enterprise portal, the native application using the generated metadata comprises using a URL scheme supported by the mobile device operating system to initiate the native application.

8. The method of claim 1, wherein the metadata provides a context to the native application, the context comprising a plurality of suggested contents, documents, data, or applications associated with the native application.

9. A computer-program product comprising computer-readable instructions embodied on tangible non-transitory media and operable when executed to:
receive a request from a mobile device to connect to a business enterprise portal, wherein the business enterprise portal provides web-based and native-application-based content, and wherein the request contains a business enterprise portal user's digital identity;

automatically transmit, responsive to the request, a business-enterprise-portal-generated module to the mobile device which is executed for mobile device inspection to identify a native application locally operational on the mobile device that is applicable to a function of the business enterprise portal;

receive data from the mobile device to identify the native application, wherein the native application is associated with the web-based and native-application-based content;

generate metadata associated with at least the native application, the metadata based on the business enterprise portal user's digital identity and providing business-enterprise-portal-associated contextual information used to contextually launch the native application;

verify, based on a requirement of the generated metadata, that the native application version matches a native application version required to contextually launch information on the native application;

generate a data object representing the native application and the associated metadata, the data object linked to the native application and metadata and used to apply the metadata to the native application when the native application is contextually launched; and transmit the data object to the mobile device for presentation as a data object representation on the mobile device, wherein the data object representation is at least one of a hyperlink, thumbnail, or icon; and responsive to a user action selecting a particular data object representation, contextually launch the native application on the mobile device using the data object.

10. The computer-program product of claim 9, wherein the metadata associated with at least the native application comprises a name, a description, an introduction date, version information, version history, vendor information, rating information, tag information, comments, operating system information, a role of the mobile device, a usage history, a preference record, parameters describing such, or a combination of such.

11. The computer-program product of claim 9, further comprising computer-readable instructions embodied on tangible non-transitory media and operable when executed to:
verify a version of the native application using the metadata; and
update the native application, in response to a determination that the metadata is not applicable to the version of the native application, into a new version of the native application.

12. The computer-program product of claim 11, wherein updating into a new version of the native application comprises downloading the new version of the native application from a web source and installing the new version of the native application to the mobile device.

13. The computer-program product of claim 9, wherein generating metadata associated with at least the native application comprises assigning the native application to an end user.

14. The computer-program product of claim 9, further comprising computer-readable instructions embodied on tangible non-transitory media and operable when executed to maintain the metadata based on activities in the launched native application.

15. A system of one or more computers configured to perform operations comprising:
receiving a request from a mobile device to connect to a business enterprise portal, wherein the business enterprise portal provides web-based and native-applicationbased content, and wherein the request contains a business enterprise portal user's digital identity;

automatically transmitting, responsive to the request, a business-enterprise-portal-generated module to the mobile device which is executed for mobile device inspection to identify a native application locally operational on the mobile device that is applicable to a function of the business enterprise portal;

receiving data from the mobile device to identify the native application, wherein the native application is associated with the web-based and native-application-based content;

generating metadata associated with at least the native application, the metadata based on the business enterprise portal user's digital identity and providing business-enterprise-portal-associated contextual information used to contextually launch the native application;

verifying, based on a requirement of the generated metadata, that the native application version matches a native application version required to contextually launch information on the native application;

generating a data object representing the native application and the associated metadata, the data object linked to the native application and metadata and used to apply the metadata to the native application when the native application is contextually launched; and transmitting the data object to the mobile device for presentation as a data object representation on the mobile device, wherein the data object representation is at least one of a hyperlink, thumbnail, or icon; and responsive to a user action selecting a particular data object representation, contextually launching the native application on the mobile device using the data object.

16. The system of claim 15, wherein the metadata associated with at least the native application comprises a name, a description, an introduction date, version information, version history, vendor information, rating information, tag information, comments, operating system information, a role of the mobile device, a usage history, a preference record, parameters describing such, or a combination of such.

17. The system of claim 15 further configured to perform operations comprising:

verifying a version of the native application using the metadata; and updating the native application, in response to a determination that the metadata is not applicable to the version of the native application, into a new version of the native application.

18. The system of claim 17, wherein updating into a new version of the native application comprises downloading the new version of the native application from a web source and installing the new version of the native application to the mobile device.

19. The system of claim 15, wherein generating metadata associated with at least the native application comprises assigning the native application to an end user.

20. The system of claim 15 further configured to perform operations comprising maintaining the metadata based on activities in the launched native application.

* * * * *